(12) United States Patent
Yachi (10) Patent No.: US 6,895,819 B1
(45) Date of Patent: May 24, 2005

(54) ACCELERATION SENSOR

(75) Inventor: Masanori Yachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/397,675

(22) Filed: Sep. 16, 1999

(30) Foreign Application Priority Data

Sep. 18, 1998  (JP) .......................................... 10-265055

(51) Int. Cl.[7] .......................... G01P 15/09; G01P 15/00
(52) U.S. Cl. ................................. 73/514.34; 73/514.01
(58) Field of Search .............................. 73/514.34, 510, 73/511, 512, 504.03, 514.01, 514.02, 504.02, 652, 514.33

(56) References Cited

U.S. PATENT DOCUMENTS

| | | | | |
|---|---|---|---|---|
| 4,601,206 A | * | 7/1986 | Watson ......................... | 73/510 |
| 4,848,157 A | * | 7/1989 | Kobayashi ............... | 73/514.33 |
| 5,383,363 A | * | 1/1995 | Kulmaczewski ............. | 73/510 |
| 5,444,639 A | * | 8/1995 | White .......................... | 73/510 |
| 5,665,914 A | * | 9/1997 | Yamamoto ............... | 73/514.33 |
| 5,677,485 A | * | 10/1997 | Nakamura ............... | 73/514.29 |
| 5,691,471 A | * | 11/1997 | Okazaki et al. ........... | 73/504.03 |
| 5,708,320 A | * | 1/1998 | Ohnishi et al. ............. | 310/321 |
| 5,792,953 A | * | 8/1998 | Kaneko et al. .......... | 73/514.15 |
| 5,922,955 A | * | 7/1999 | Brun et al. ............... | 73/514.01 |
| 6,006,606 A | * | 12/1999 | Shinogi et al. .......... | 73/514.33 |

FOREIGN PATENT DOCUMENTS

| | | |
|---|---|---|
| DE | 195 20 004 A1 | 7/1995 |
| DE | 196 10 554 | 10/1996 |
| EP | 0 707 212 A2 | 4/1996 |
| EP | 0 791 832 A1 | 8/1997 |
| JP | 62-093668 | 4/1987 |
| JP | 03-082910 | 4/1991 |
| JP | 03-120415 | 5/1991 |
| JP | 03-122518 | 5/1991 |
| JP | 6-160422 | 6/1994 |
| JP | 07-191052 | 7/1995 |
| JP | 08-122172 | 5/1996 |
| JP | 8-327654 | 12/1996 |
| JP | 9-318359 | 12/1997 |

\* cited by examiner

*Primary Examiner*—Helen C. Kwok
(74) *Attorney, Agent, or Firm*—Westerman, Hattori, Daniels & Adrian, LLP (57) ABSTRACT

An acceleration sensor which has a vibrator, a weight portion that is connected to the vibrator, and supported at a position different from the center of gravity of the vibrator plus its own structure, and a detecting section which detects the amount of characteristic corresponding to an angular moment that is exerted in the vibrator upon application of an acceleration in one direction to the vibrator and the weight portion. When an acceleration in one direction is applied to the vibrator and the weight portion connected thereto, an angular moment is exerted in the vibrator due to the difference between the supporting point of the weight portion and the center of gravity of the vibrator plus the weight portion, and the amount of characteristic corresponding to the angular moment is detected by the detecting section so that the acceleration of a linear motion is detected.

2 Claims, 8 Drawing Sheets

ACCELERATION

ACCELERATION SENSOR

BACKGROUND OF THE INVENTION

The present invention relates to an acceleration sensor and more particularly concerns an acceleration sensor that detects an acceleration in one direction (acceleration in linear motion).

Conventionally, small-size acceleration sensors of various types for detecting acceleration have been put into practical use. For example, with respect to cantilever-type acceleration sensors, the following acceleration sensors have been known: those having a construction in which a piezoelectric element is cantilevered and supported by a support member so that a voltage caused by a distortion in the piezoelectric element in response to a generated acceleration is sensed and the acceleration is consequently detected; and those having a construction in which a semiconductor is cantilevered and supported by a support member so that a change in resistivity due to a distortion in the semiconductor in response to a generated acceleration is sensed and the acceleration is consequently detected. Moreover, other acceleration sensors have been proposed in which the inertia of an optical fiber gyro is utilized so as to detect an acceleration.

In the case of the above-mentioned cantilever-type acceleration sensors, in order to distort the structural element (piezoelectric element or semiconductor), it is necessary to increase the mass of the structural element so as to obtain a greater stress. Therefore, in order to enhance the detection precision, it is inevitable to make the acceleration sensors heavier and bulkier. Moreover, in the case of the acceleration sensor using an optical fiber gyro, when the diameter of the optical fiber is made smaller in an attempt to make the acceleration sensor smaller, the detection precision tends to deteriorate. Furthermore, since it is not possible to separate an acceleration in one direction and a rotation angular velocity by using a single acceleration sensor, there are still some problems to be solved before this is put into practical use.

BRIEF SUMMARY OF THE INVENTION

One objective of the present invention is to provide a small-size acceleration sensor which can detect an acceleration in one direction with high precision.

Another objective of the present invention is to provide an acceleration sensor which can separate an acceleration in one direction and a rotation angular velocity by using only a single sensor so as to detect the acceleration in one direction accurately.

Still another objective of the present invention is to provide an acceleration sensor which can detect accelerations in the respective three-dimensional directions at the same time.

The acceleration sensor in accordance with the first aspect of the present invention is provided with a vibrator, a weight portion that is connected to the vibrator, and supported at a position different from the center of gravity of the vibrator plus its own structure, and a detecting section which detects the amount of characteristic corresponding to an angular moment that is exerted in the vibrator upon application of an acceleration in one direction to the vibrator and the weight portion.

Figure 1:
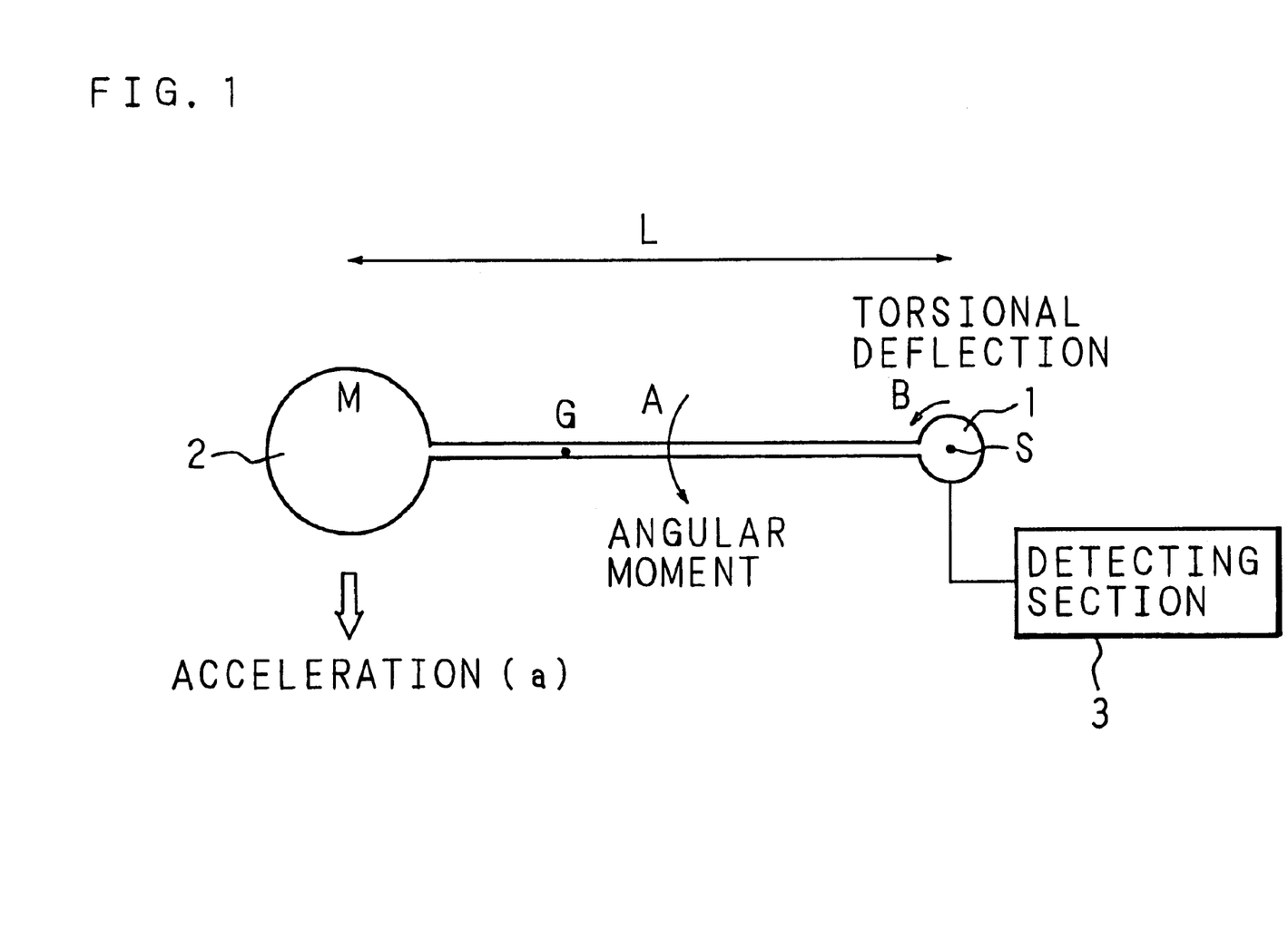
FIG. 1 is an explanatory drawing that shows the detection principle of an acceleration sensor of the present invention.

FIG. 1 is an explanatory drawing that shows the detection principle of the acceleration sensor of the present invention. The acceleration sensor of the present invention has a vibrator 1, a weight portion 2 connected thereto, and a detecting section 3. The weight portion 2 is supported at a supporting point S, and the position of this supporting point S is different from the position of the center of gravity G of the vibrator 1 and the weight portion 2. When such an acceleration sensor is subjected to an acceleration in one direction (in the void arrow direction of FIG. 1), an angular moment centered on the supporting point S (arrow A, size MLa in FIG. 1 (where M: mass of the weight portion 2, L: distance from the supporting point S to the center of gravity of the weight portion 2, a: applied acceleration)) is exerted. A torsional deflection (arrow B in FIG. 1) is exerted in the vibrator 1 by this angular moment. The detecting section 3 detects the amount of characteristic corresponding to this angular moment. Since the size of the angular moment is proportional to the size of the acceleration of a detection target, it is possible to detect the acceleration by detecting the amount of characteristic.

In the acceleration sensor in accordance with the second aspect which has the same construction as the first aspect, the vibrator is provided as a torsion vibrator made by a piezoelectric element, and the amount of characteristic is provided as a voltage in the torsion vibrator corresponding to the angular moment. The torsion vibrator of the piezoelectric element is used as the vibrator, and a difference in output voltages corresponding to the angular moments is sensed so that the acceleration is detected. Thus, it is possible to achieve a vibrator having a simple structure.

The acceleration sensor in accordance with the third aspect is provided with a vibrator, a weight portion that is connected to the vibrator, and supported at a position different from the center of gravity of the vibrator plus its own structure, and a detecting section which detects a Coriolis force that is caused by a rotation angular velocity exerted in the vibrator upon application of an acceleration in one direction to the vibrator and the weight portion while the vibrator is vibrating in a constant direction. When the vibrator is subjected to an acceleration in one direction while being vibrated, the angular moment generates a rotation angular velocity in the vibrator, and the rotation angular velocity results in a Coriolis force that is orthogonal to the vibration direction of the vibrator. The acceleration is detected by sensing this Coriolis force. Thus, it becomes possible to detect the acceleration with a simple construction.

In the acceleration sensor in accordance with the fourth aspect which has a construction similar to the third aspect, the rotation axis of the rotation angular velocity is set in the same direction as the detection axis of the Coriolis force. Since the rotation axis of the rotation angular velocity is set in the same direction as the detection axis of the Coriolis force, the Coriolis force, which is caused by the rotation angular velocity exerted in the vibrator due to the angular moment, is accurately detected so that it becomes possible to improve the detection precision for acceleration.

In the acceleration sensor in accordance with the fifth aspect which has the same construction as the third aspect, at least one portion of the weight portion is formed as an elastic member. Since at least one portion of the weight portion is an elastic member, it is possible to increase the rotation angular velocity exerted by the angular moment.

The acceleration sensor in accordance with the sixth aspect is provided with a first sensor which has a first vibrator supported at a position, with the center of gravity thereof being different from the position at which the first vibrator is supported, in which, upon application of an acceleration in one direction, a rotation angular velocity is exerted in the first vibrator; and a second sensor which has a second vibrator supported at a position, with the center of gravity thereof being the same as the position at which the second vibrator is supported, in which, upon application of an acceleration in one direction, no rotation angular velocity is exerted in the second vibrator, and a differential detector which detects a difference between outputs of the first sensor and the second sensor. Thus, the difference is detected between the output of the first sensor that has the supporting position and the center of gravity different from each other so as to generate a rotation angular velocity corresponding to an acceleration in one direction in the first vibrator and the output of the second sensor that has the supporting position and the center of gravity coincident with each other so as to generate no rotation angular velocity corresponding to an acceleration in one direction in the second vibrator. The output of the first sensor contains a component corresponding to the rotational motion of the entire system and a component corresponding to the acceleration in one direction, while the output of the second sensor contains only the component corresponding to the rotational motion of the entire system. Therefore, by detecting the difference between the output of the first sensor and the output of the second sensor, only the component corresponding to the acceleration in one direction can be detected; therefore, even if the entire system is rotating, the acceleration in one direction can be detected accurately by using a single acceleration sensor. Moreover, it becomes possible to separate the rotational motion of the entire system and a linear motion.

In the acceleration sensor in accordance with the seventh aspect which has a construction similar to the sixth aspect, the rotation axis of the rotation angular velocity of the first sensor and the rotation axis of the rotation angular velocity of the second sensor are set in the same direction. Since the rotation axis of the rotation angular velocity of the first sensor and the rotation axis of the rotation angular velocity of the second sensor are set in the same direction, it is possible to detect the component corresponding to the acceleration in one direction with high precision.

In the acceleration sensor in accordance with the eighth aspect which has the same construction as the sixth or seventh aspect, the characteristic of the first vibrator and the characteristic of the second vibrator are made coincident with each other. Since the characteristics (sensitivity, frequency response, etc.) of the first and second sensors are made coincident with each other, the same components are detected with respect to the component corresponding to the rotational motion of the entire system; thus, it becomes possible to detect the component corresponding to the acceleration in one direction with high precision.

In the acceleration sensor in accordance with the ninth aspect which has a construction similar to that of any one of the sixth, seventh or eighth aspect, a plurality of sets each of which consists of the first sensor, the second sensor and the differential detector are provided.

In the acceleration sensor in accordance with the tenth aspect which has a similar construction to the ninth aspect, three sets each of which consists of the first sensor, the second sensor and the differential detector are provided, and these sets are arranged so that the detection directions for acceleration in the respective sets are made orthogonal to each other.

In the case when two sets each of which consists of the first sensor, the second sensor and the differential detector are installed in a manner so as to align their detection axes orthogonal to each other, accelerations in linear motions in the two-dimensional directions can be simultaneously detected on a plane, and in the case when three sets thereof are installed with their detection axes being orthogonal to each other, accelerations in linear motions in the three-dimensional directions can be simultaneously detected in three dimensions.

The above and further objects and features of the invention will more fully be apparent from the following detailed description with accompanying drawings.

DETAILED DESCRIPTION OF THE INVENTION

Referring to Figures, the following description will discuss embodiments of the present invention.

(First Embodiment)

Figure 2:
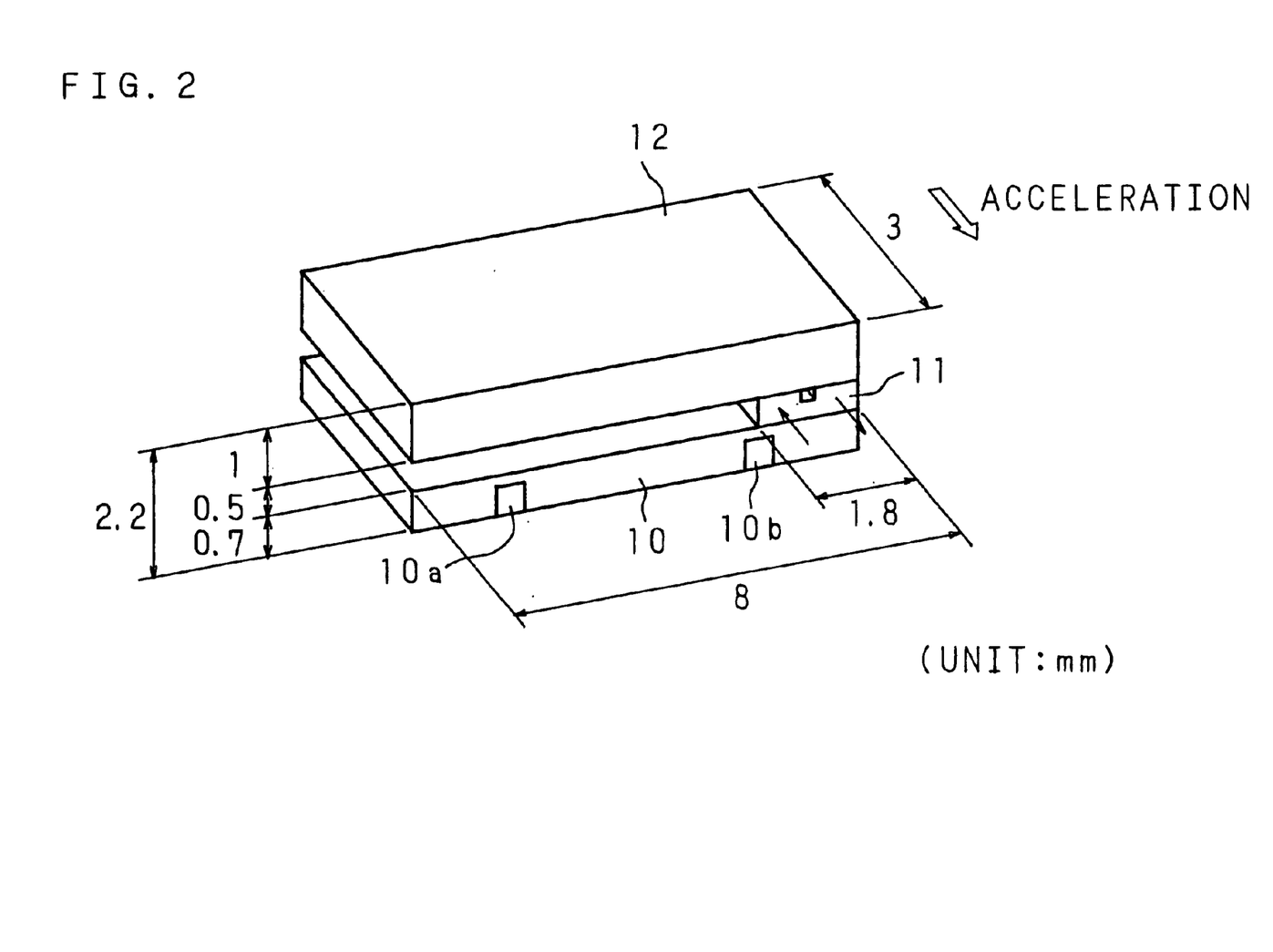
FIG. 2 is a perspective view that shows the construction of an acceleration sensor in accordance with the first embodiment.

FIG. 2 is a perspective view that shows the construction of an acceleration sensor in accordance with the first embodiment of the present invention. This acceleration sensor is provided with a base 10 (3 mm in width, 8 mm in length and 0.7 mm in height) having a rectangular parallelepiped shape, a vibrator 11 (3 mm in width, 1.8 mm in length and 0.5 mm in height) having a rectangular parallelepiped shape that is constituted by a piezoelectric element made of, for example, 165Y—$LiNbO_3$, and a weight portion 12 (3 mm in width, 8 mm in length and 1 mm in height) having a rectangular parallelepiped shape made of, for example, lead glass. The vibrator 11 is connected to an edge portion of the weight portion 12 with a face (3 mm×0.5 mm) of the vibrator 11 being made flush with a face (3 mm×1 mm) of the weight portion 12. The base 10 is joined to the weight portion 12 with their identical largest surfaces aligned face to face with each other, and the vibrator 11 is supported at an edge portion of the base 10. On the base 10, an output electrode 10a for drawing the output of the vibrator 11 and a GND electrode 10b used for connection to earth are installed.

Figure 3:
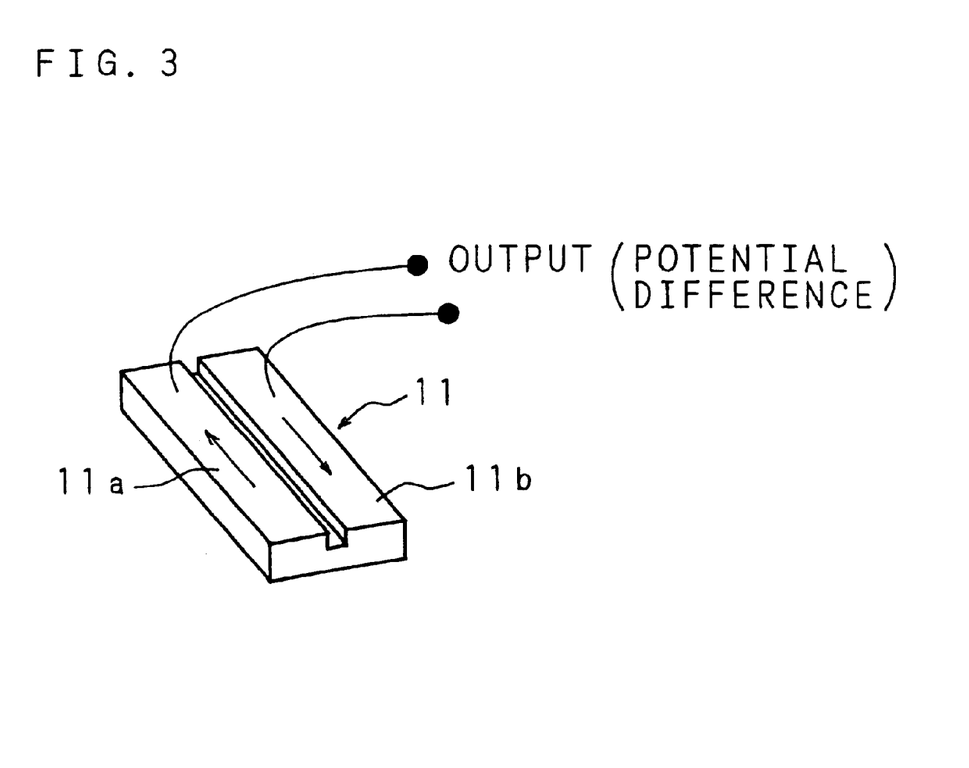
FIG. 3 is a perspective view that shows the construction of a vibrator (torsion vibrator) in the first embodiment.

FIG. 3 is a perspective view that shows the construction of the vibrator 11. The vibrator 11 is a torsion vibrator having two sliding vibrators 11a and 11b, and arranged so that a potential difference caused by sliding stresses (indicated by arrows in FIG. 3) having directions different from each other on the two sliding vibrators 11a and 11b is detected.

In such an acceleration sensor, upon application of an acceleration in one direction (in the direction of the void arrow of FIG. 2), an angular moment, centered on the supporting point of the vibrator 11, is exerted due to a positional offset between the center of gravity and the supporting point, with the result that each of the two sliding vibrators 11a and 11b of the vibrator 11 is subjected to lateral sliding in a different direction from each other. Since a potential difference is exerted between the sliding vibrators 11a and 11b due to torsion vibration caused by the lateral sliding, the acceleration can be detected by sensing this potential difference by using the output electrode 10a.

Here, in the above-mentioned example, the torsion vibrator having the two sliding vibrators 11a and 11b is used as the vibrator 11; however, a torsion vibration tuning fork may be used as the vibrator 11. Moreover, if a longitudinal vibrator is used, it becomes possible to detect a stress due to an angular moment in a longitudinal direction.

(Second Embodiment)

Figure 4:
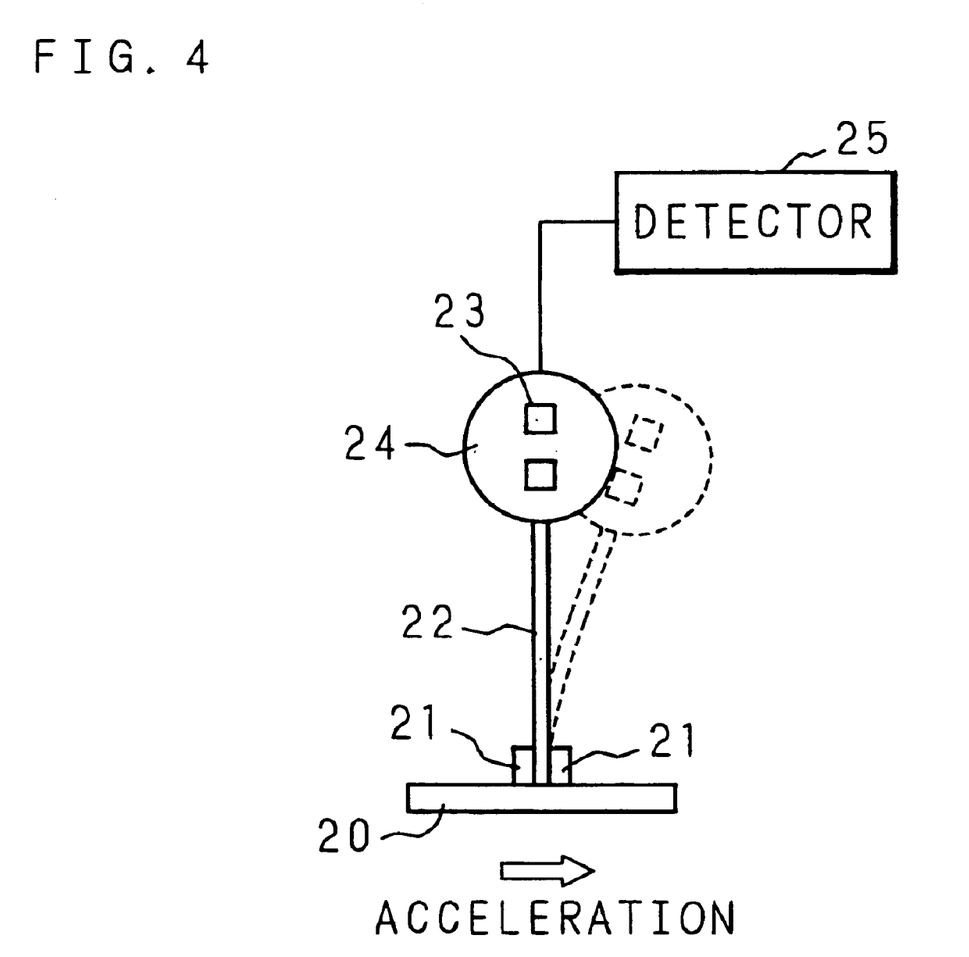
FIG. 4 is a front view that shows the construction of an acceleration sensor in accordance with the second embodiment.
Figure 5:
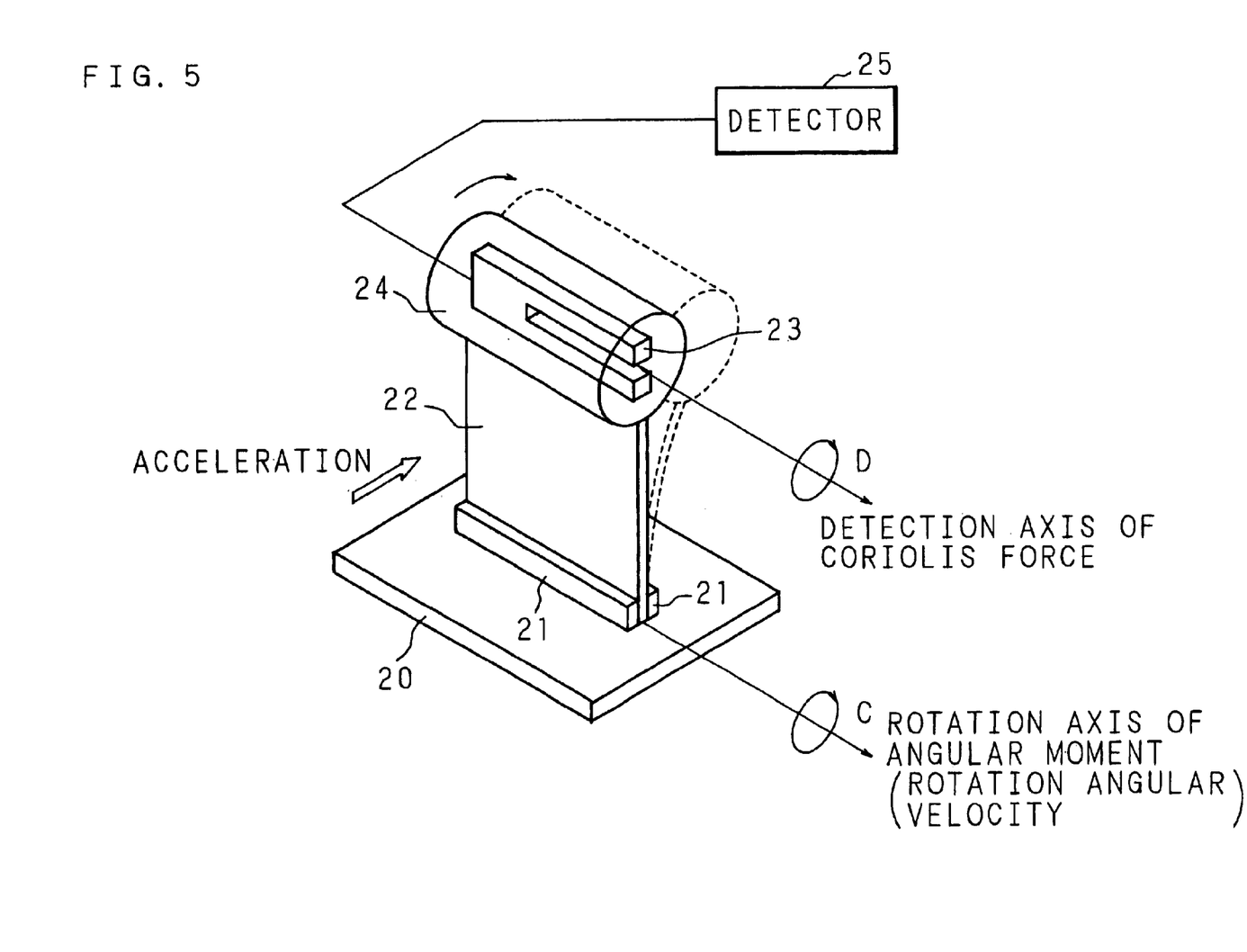
FIG. 5 is a perspective view that shows the construction of the acceleration sensor in the second embodiment.

FIGS. 4 and 5 are front and perspective views that show the construction of an acceleration sensor in accordance with the second embodiment of the present invention. This acceleration sensor is provided with a base 20 having a flat rectangular parallelepiped shape, and on the base 20 are installed a flat supporting portion 22 that is formed by an elastic member made of, for example, silicone rubber, and that is supported by a rubber member 21 in a manner so as to stick out from the base 20, a gyro element 24 that is attached to the tip of the supporting portion 22 and contains a built-in tuning-fork-type vibrator 23, and a detector 25 for detecting a Coriolis force exerted in the tuning-fork-type vibrator 23.

Figure 6A:
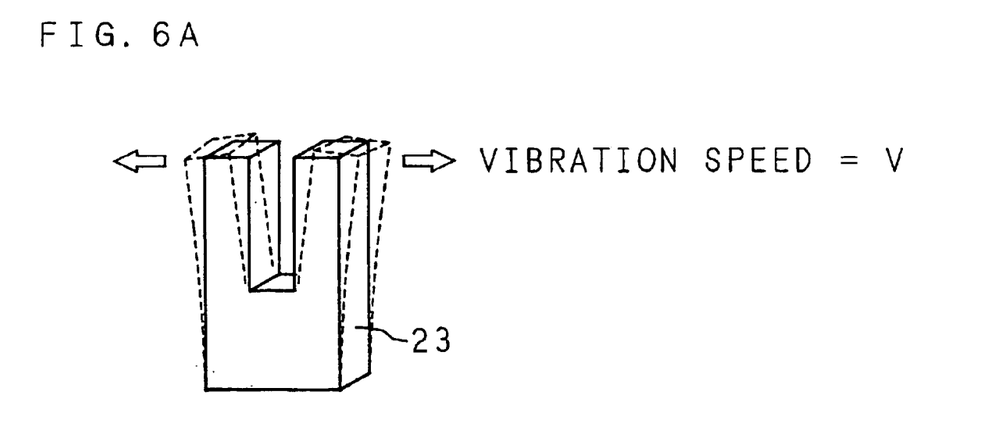
FIGS. 6a and 6b are explanatory drawings that show a state of a tuning-fork-type vibrator at the time of detecting acceleration.
Figure 6B:
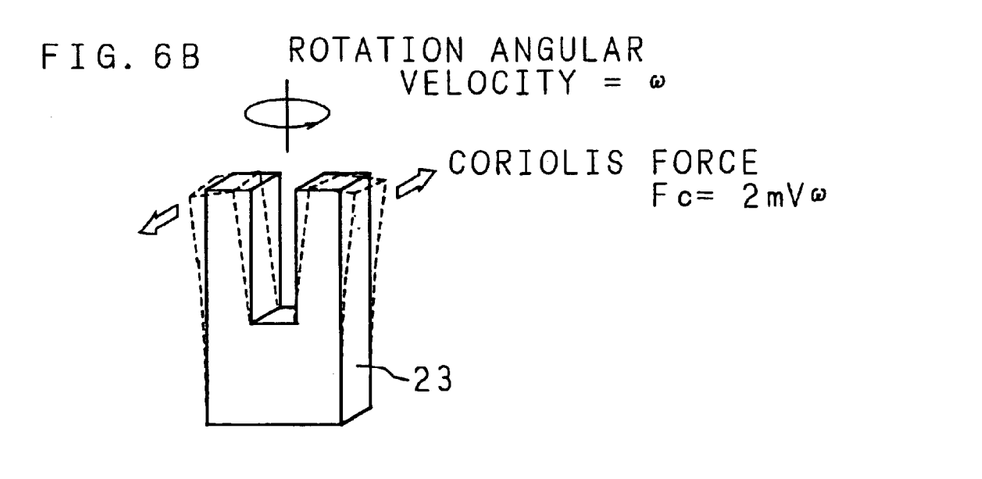

FIG. 6 is an explanatory drawing that shows a state of the tuning-fork-type vibrator 23 at the time of detecting an acceleration in such an acceleration sensor. During the acceleration detection, the tuning-fork-type vibrator 23 is always driven in one direction (in the void arrow direction of FIG. 6A) as shown in FIG. 6A. Upon receipt of an acceleration in one direction (in the void arrow direction of FIG. 4 and FIG. 5), an angular moment (rotation angular velocity) is exerted due to a positional off-set between the center of gravity and the supporting point. When such a rotation angular velocity is exerted, a Coriolis force (in the void arrow direction of FIG. 6B, size Fc=2 mVω (m: the mass of the tuning-fork-type vibrator 23, V: vibration speed, ω: rotation angular velocity)) is exerted in a direction orthogonal to the vibrating direction. Thus, the acceleration is detected by sensing the Coriolis force by the use of the detector 25.

The rotation axis (arrow C in FIG. 5) of the angular moment (rotation angular velocity) caused by the acceleration and the detection axis (arrow D in FIG. 5) of the Coriolis force applied onto the tuning-fork-type vibrator 23 are set in the same direction so that the acceleration can be detected accurately by detecting the Coriolis force. Moreover, the elastic member is used as the supporting portion 22; therefore, in the case when the tuning-fork-type vibrator 23 is attached to the end of the supporting portion 22, as compared with the application of a rigid member as the supporting portion 22, even if an angular moment having the same size is exerted, a greater rotation angular velocity is generated, thereby making it possible to improve the sensitivity.

Here, in the above-mentioned example, the tuning-fork-type vibrator 23 is used; however, a prism-shaped vibrator or a column-shaped vibrator may be used as long as a Coriolis force is exerted in response to a rotation angular velocity. Moreover, although the supporting portion 22 is provided as an elastic member, a rigid member, supported by a spring, may be adopted. In the case of this construction, the tuning-fork-type vibrator 23 has a rotation angular velocity of the same size at any portion thereof.

(Third Embodiment)

In the case when the base supporting the tuning-fork-type vibrator is not allowed to rotate, the above-mentioned second embodiment makes it possible to detect an acceleration in one direction accurately. However, it is more likely that the base itself would rotate. In such a case, a Coriolis force due to such a rotation is also exerted in the tuning-fork-type vibrator; therefore, it is not possible to detect an accurate acceleration in one direction without separating the Coriolis force caused by the acceleration in one direction and the Coriolis force caused by the rotation of the base. The following third embodiment gives an example in which the Coriolis forces of these two types are separated so that the acceleration in one direction can be detected accurately even if the base is allowed to rotate.

Figure 7:
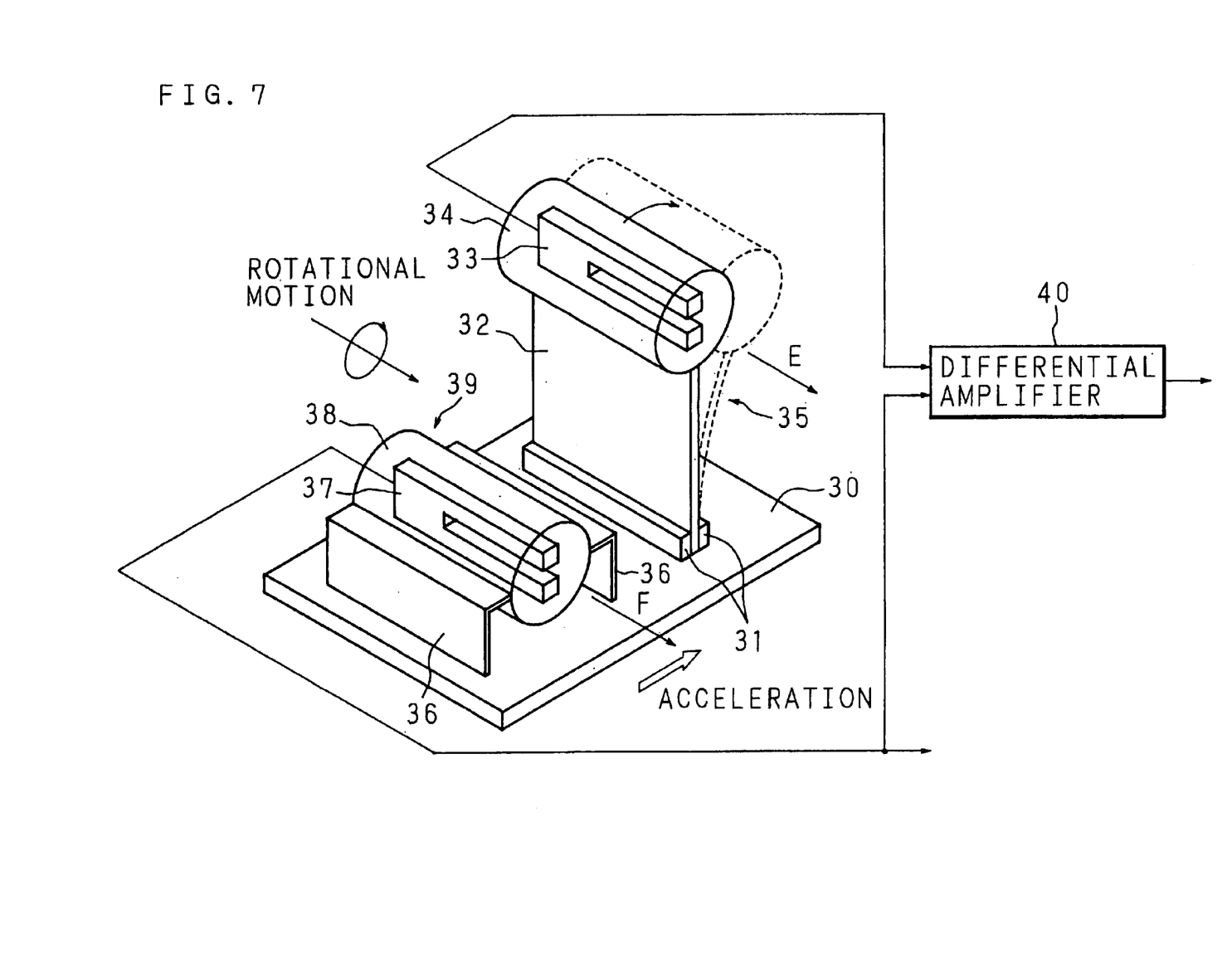
FIG. 7 is a schematic perspective view that shows the construction of an acceleration sensor in accordance with the third embodiment.

FIG. 7 is a schematic perspective view that shows the construction of an acceleration sensor in accordance with the third embodiment of the present invention. This acceleration sensor is provided with a base 30 having a flat rectangular parallelepiped shape; a first sensor 35 which has a flat supporting portion 32 that is formed by an elastic member made of, for example, silicone rubber, and that is supported by a rubber member 31 in a manner so as to stick out from the base 30, and a gyro element 34 that is attached to the tip of the supporting portion 32 and contains a built-in tuning-fork-type vibrator 33; a second sensor 39 which has a gyro element 38 that is secured to the base 30 by a metal member 36 and that contains a built-in tuning-fork-type vibrator 37; and a differential amplifier 40 which detects a difference between the output of the first sensor 35 and the output of the second sensor 39. The gyro element 34 of the first sensor 35 and the gyro element 38 of the second sensor 39 are set to have the same characteristics in the sensitivity to the rotation angular velocity, the frequency response, etc., and also have the same direction in the detection axis (arrows E and F in FIG. 7) of Coriolis forces; thus, each of them exerts a Coriolis force having the same size in response to a rotation angular velocity having the same size.

The first sensor 35, which has the same construction as the acceleration sensor in the aforementioned second embodiment, has its positions of the supporting point and the center of gravity different from each other; therefore, an angular moment is exerted upon receipt of an acceleration in one direction (in the void arrow direction in FIG. 7). In contrast, the second sensor 39 has its positions of the supporting point and the center of gravity coincident with each other; therefore, no angular moment is exerted even upon receipt of an acceleration in one direction.

Upon receipt of an acceleration in one direction (in the void arrow direction in FIG. 7) in a state where the base 30 is allowed to rotate, an angular moment (rotation angular velocity) is exerted in the first sensor 35 due to a positional off-set between the center of gravity and the supporting point. Then, in the same manner as the second embodiment, a Coriolis force is exerted in the tuning-fork-type vibrator 33 due to the rotation angular velocity caused by the acceleration in one direction, and another Coriolis force is also exerted in the tuning-fork-type vibrator 33 due to a rotation angular velocity caused by the rotation of the base 30. An electric signal formed by adding these Coriolis forces of the two types is outputted to the differential amplifier 40.

In contrast, even upon receipt of an acceleration in one direction in a state where the base 30 is allowed to rotate, the second sensor 39 is not subjected to an angular moment (rotation angular velocity) due to the acceleration since the positions of the supporting point and the center of gravity are coincident with each other, and only the Coriolis force due to the rotational motion of the base 30 is exerted in the tuning-fork-type vibrator 37. The size of this Coriolis force is equal to the size of the Coriolis force caused by the rotational motion of the base 30 in the first sensor 35. Then, the electric signal corresponding to this Coriolis force is outputted to the differential amplifier 40 and other peripheral devices.

The differential amplifier 40 detects a difference between the output of the first sensor 35 and the output of the second sensor 39, and amplifies the difference to an appropriate size so as to output it. Therefore, the output from the differential amplifier 40 is allowed to exhibit only the Coriolis force caused by the acceleration in one direction, and the acceleration is detected by sensing this output. As a result, the state of a linear motion can be confirmed by the output of the differential amplifier 40, while the state of a rotational motion can be confirmed by the output from the second sensor 39.

As described above, in the third embodiment, even if a rotational motion occurs in the entire system, the acceleration in one direction can be detected accurately. Moreover, types of motions can be classified into the linear motion and the rotational motion.

(Fourth Embodiment)

Figure 8:
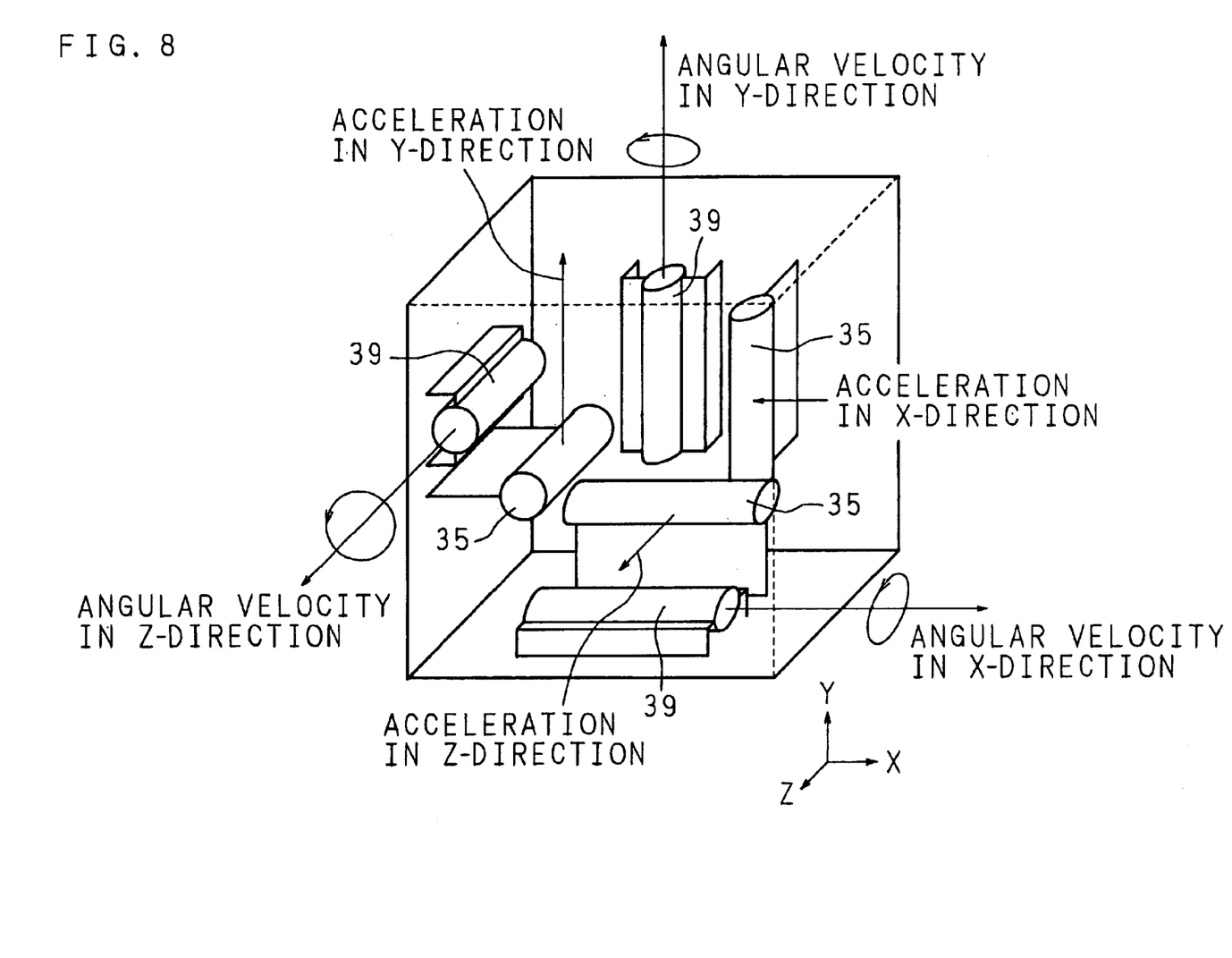
FIG. 8 is a schematic perspective view that shows the construction of an acceleration sensor in accordance with the fourth embodiment.

FIG. 8 is a schematic perspective view that shows the construction of an acceleration sensor in accordance with the fourth embodiment of the present invention. The fourth embodiment gives an example in which accelerations in the respective three dimensional directions (X-direction, Y-direction and Z-direction) are detected simultaneously.

In this acceleration sensor, three sets of acceleration sensors, each of which has the first sensor 35, the second sensor 39 and the differential amplifier 40 that have been explained in the third embodiment, are installed with their acceleration detecting directions arranged orthogonal to each other. In one set of the acceleration sensors, the first sensor 35 and the second sensor 39 have their detection directions for acceleration aligned in X-direction. In another set of the acceleration sensors, the first sensor 35 and the second sensor 39 have their detection directions for acceleration aligned in Y-direction, and in the other set of the acceleration sensors, the first sensor 35 and the second sensor 39 have their detection directions for acceleration aligned in Z-direction. Here, the construction and operation of each set of the acceleration sensors are the same as the acceleration sensor in the third embodiment. Here, in FIG. 8, the differential amplifiers are omitted from the drawing.

With this arrangement, the linear acceleration in X-direction, the linear acceleration in Y-direction and the linear acceleration in Z-direction can be detected simultaneously. Moreover, the linear motion and the rotational motion can be recognized in three-dimensions.

As described above, in the present invention, the amount of characteristic of an angular moment exerted on a vibrator upon application of an acceleration in one direction is detected so that the acceleration can be detected; therefore, it becomes possible to detect the acceleration in one direction with high precision by using a small-size construction.

Moreover, upon application of an acceleration in one direction, a Coriolis force due to the angular moment exerted in the vibrator being vibrated is sensed so that the acceleration can be detected; therefore, even if the entire system is allowed to rotate, it is possible to detect the acceleration in one direction accurately.

Furthermore, since three sets of the acceleration sensors are installed with their detection directions being aligned orthogonal to each other, it becomes possible to simultaneously detect accelerations in the respective three-dimensional directions.

As described above, the acceleration sensor of the present invention makes it possible to detect an acceleration in a linear direction without the need for utilizing a stress distortion, and consequently to develop the application of the acceleration sensor to a new technical field.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An acceleration sensor for detecting acceleration, comprising:

a base having a first surface delineated by a first plurality of edges;

a transducer that is not permanently oscillating, is supported at the base and exhibits torsion vibration only when acceleration is caused;

a weight portion that is connected to the not permanently oscillating transducer, and supported at a position different from the center of gravity of the transducer and the weight portion itself, the weight portion having a first surface delineated by a second plurality of edges, each edge of the first plurality of edges being adjacent to a respective edge of the second plurality of edges; and a detecting section which is formed on the transducer and detects the amount of characteristic corresponding to a torsion of the transducer caused by an angular moment centered on the supporting position of the weight portion upon application of acceleration in one direction to the transducer and the weight portion;

wherein a face of the transducer is made flush with a face of the weight portion, and the base, the transducer and the weight portion are stacked in the height direction, and the transducer is a torsion vibrator having two sliding vibrators.

2. The acceleration sensor according to claim 1, wherein the amount of characteristic is a voltage caused by sliding stresses having directions different from each other on the two sliding vibrators.

* * * * *